Feb. 24, 1970          D. D. EDEN          3,497,285
RESOLVABLE ELEMENT ENHANCEMENT FOR OPTICAL SCANNING
Filed July 18, 1966
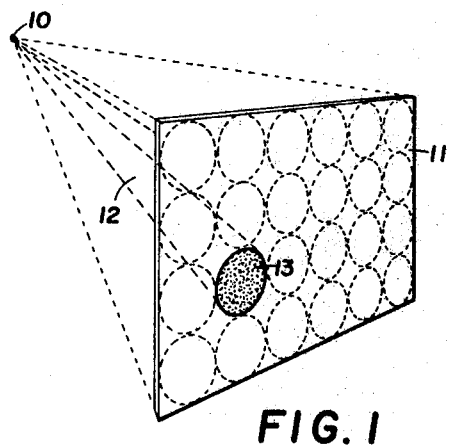
FIG. 1
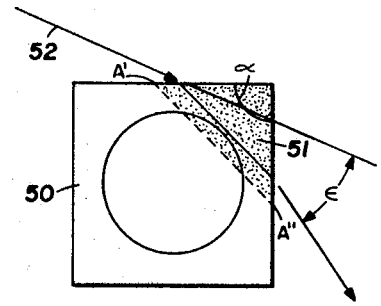
FIG. 4
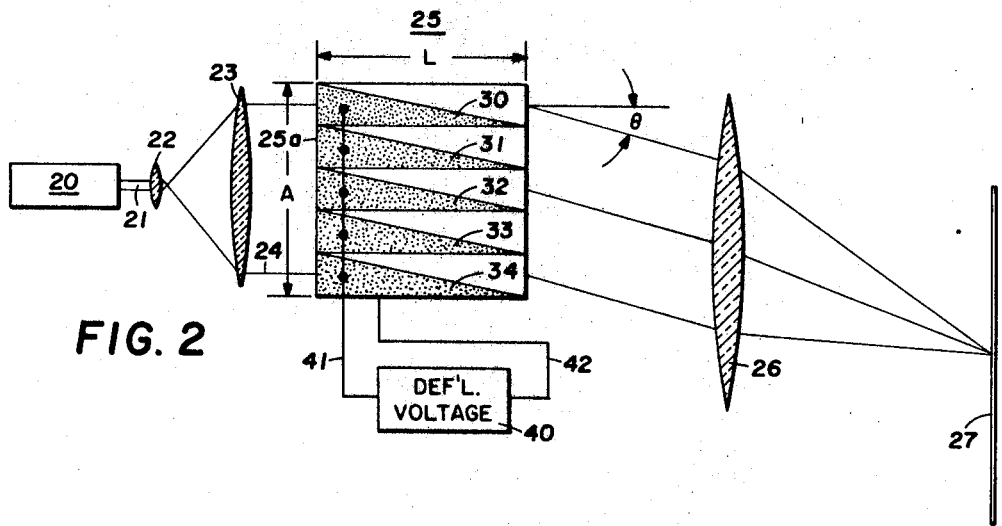
FIG. 2
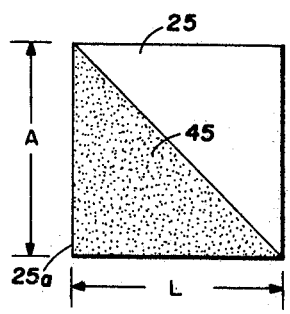
FIG. 3    *PRIOR ART*
INVENTOR:
DAYTON D. EDEN
ATTORNEY

United States Patent Office 3,497,285
Patented Feb. 24, 1970

3,497,285
RESOLVABLE ELEMENT ENHANCEMENT FOR
OPTICAL SCANNING
Dayton D. Eden, Dallas, Tex., assignor to Texas Instruments Incorporated, Dallas, Tex., a corporation of Delaware
Filed July 18, 1966, Ser. No. 565,864
Int. Cl. G02f 1/28, 1/34
U.S. Cl. 350—160
9 Claims

ABSTRACT OF THE DISCLOSURE

Disclosed is a system and method for increasing the number of resolvable elements for a given aperture through which light from a spatially coherent light source passes, comprising a crystal in the path of light from said source having a plurality of nonoverlapping juxtaposed triangular zones defined by a plurality of electrodes applied to the opposite faces of the crystal, each zone having one of its edges parallel to the direction of propagation of the light through the crystal, and the other perpendicular to the direction of light propagation and means for applying a potential to the electrodes to effect various indices of refraction within the crystal.

This invention relates to optical scanning and more particularly to the use of an array of biprisms of geometrically selectively variable index of refraction to maximize the number of resolvable elements (NRE) that can be produced.

In light scanning systems and in system in which a dynamic visual display is to be produced, it is desirable to maximize, for a given aperture, the number of resolvable spots that can be produced. Further, because of time limitations placed on such a system, it is necessary that the scanning system be non-mechanical. The development of photoelectric materials has been found to provide a non-mechanical means for light deflection by varying the index of refraction in a suitably shaped body of such materials. In use of such systems, it has been found that more important than the mere ability to deflect the light beam is the ability to scan through an angle large compared to the Fraunhofer diffraction spreading of the beam. The number of resolvable elements is known to depend upon the prism aperture.

In accordance with the present invention, a body of ferroelectric material is so arranged and controlled as to increase the number of resolvable elements for a given aperture. More particularly, in accordance with the present invention, a spatially coherent light source is employed with a deflector having a given aperture in the path of light from the source. The material forming the deflector has a controllable index of refraction. Means are provided for varying the index of refraction of the material in a plurality of triangularly shaped zones having bases facing the source and having one side parallel to the direction of light traveling from the source. The triangular shaped zones are identical and in a preferred embodiment are controlled as to index of refraction by the application of an electric field.

For a more complete understanding of the present invention and for further objects and advantages thereof, reference may now be had to the following description taken in conjunction with the accompanying drawings in which:

FIGURE 1 illustrates a display or scanned element and the number of resolvable elements therein;

FIGURE 2 illustrates one embodiment of the present invention;

FIGURE 3 illustrates a single prism deflector of the prior art; and

FIGURE 4 is illustrative of the principles involved in the present invention.

In FIGURE 1, a beam of light from a source 10 is directed onto a screen 11 or other element to be scanned by light from source 10. Light directed along the path 12 forms a spot 13 on element 11. Because of diffraction, the spot thus produced assumes a given size which heretofore has been such that for a given aperture it could not be reduced. The source 10 producing spot 13 would be capable of producing 24 resolvable elements on the screen 11 through the aperture of the source 10.

The present invention is directed to a system in which the NRE can be greatly increased. More particularly, as shown in FIGURE 2, a source 20 of spatially coherent light directs a beam 21 to a beam expander which includes lens 23 and 23. The expanded beam 24 then is directed to a beam deflector 25. The beam from the deflector 25 is then directed through a lens 26 to an element 27 which is to be scanned.

It will be appreciated that the deflection angle in FIGURE 2 is considerably exaggerated in order to illustrate the invention. Preferably in accordance with the invention, the deflector 25 will be made of a material such as potassium tantalate niobate (KTN), potassium dihydrogen phosphate (KDP) or potassium dideuterium phosphate (KD*P) and potassium dihydrogen arsenate. Of these, KTN and KD*P are of most utility and have the most desirable characteristics for the purpose of use in the deflector 25.

The configuration of the deflector 25 is significant in the present invention. The configuration is such as to make efficient use of the available change in the index of refraction in the material. The effect of the configuration is to provide a number of beam deflectors in one coherent package. The deflection angle is the same as for one unit but the result is that the Fraunhofer diffraction spread is much less. The result is to provide a much greater NRE.

More particularly, in FIGURE 2, a rectangular body of deflector material is provided with a plurality of pairs of triangularly shaped electrodes. One electrode of each pair is shown in FIGURE 2, the electrodes 30–34 being formed on one face of a rectangular polyhedron. Electrodes having identical configuration and orientation as electrodes 30–34 are then applied to the opposite face of the body 25. The base of each of the triangularly shaped electrodes is perpendicular to the incident light beam 24. The lower side, as shown in FIGURE 2, of each of the electrodes 30–34 is parallel to the direction of the incident light beam 24. The triangular shaped electrodes are identical and thus cooperate one with another to provide for deflection of the light beam through an angle θ, the magnitude of which depends upon the change produced in the index of refraction of the prismatic volumes of material 25 by application of a voltage between the electrodes 30–34 and the companion electrodes on the opposite face of unit 25. A voltage source 40 is connected to each of the electrodes 30–34 by way of conductor 41 and to the companion electrodes on the opposite face of the material 25 by way of conductor 42. It has been found that the NRE produced by the system shown in FIGURE 2, when compared with the NRE produced by the prior art system shown in FIGURE 3, is directly proportional to the number of the electrodes. Thus, the system of FIGURE 2 would produce five times as many resolvable elements as the system of FIGURE 3.

In FIGURE 3, the body 25 has been illustrated as having but a single pair of electrodes, one of which, the electrode 45, is shown. The aperture of both systems of FIGURES 2 and 3 are the same. However, the NRE is greatly different. The performance of the system of FIGURE 2 may be understood by considering either a deflection prism whose index of refraction matches its surroundings or by considering the gradient in the index of refraction transverse to the light path. The gradient may be understood to be the time spent by light between the pairs of electrodes upon entering at various points along the aperture or the base 25a.

Consider a rectangular bar 50 of KDP as shown in FIGURE 4. The X- and Y-crystallographic axes are in the plane of the paper; the optic axis is normal to the paper. If a cut is made through the crystal along the line A'–A", a prism 51 results. A light beam 52 passing through prism 51 at the angle of minimum deviation will travel parallel to the base of the prism and at 45° from the X and Y axes of the crystal, and will experience a maximum variation in index. The electric field may be applied along the optic axis ot alter such deflection.

For the angle of minimum deviation, $$N = \frac{\sin \frac{1}{2}(\epsilon + \alpha)}{\sin \frac{1}{2}\alpha} \quad (1)$$

where:

$$N = \frac{\text{index of prism}}{\text{index of surrounding medium}}$$

$\epsilon$ = angle of deviation
$\alpha$ = apex angle.

By taking the first derivative, the change in the deviated angle per unit change in index ratio can be obtained.

$$\frac{\Delta \epsilon}{\Delta N} = \frac{2 \sin \alpha/2}{\sqrt{1 - N^2 \sin^2 \alpha/2}} \quad (2)$$

It is apparent that values of $\Delta \epsilon / \Delta N$ of 10 or more might be achieved. Near the Curie point with index changes of $10^{-2}$, electrically induced variations in the angle of deviation of $\Delta \epsilon = 10 \Delta N = 10^{-1}$ rad. $\approx 5$ degrees are feasible.

One difficulty encountered in KDP is that the anomalous electro-optic effect near the Curie point is associated with a piezoelectric effect. The shape of the prism is distorted so that its apex angle changes in such a direction as to detract from the scanning effect induced by the index change. For a prism in air the two effects cancel each other. The change in deviation as a function of the change in apex angle is given by:

$$\frac{\Delta \epsilon}{\Delta \alpha} = 1 - \frac{N \cos \alpha/2}{\sqrt{1 - N^2 \sin^2 \alpha/2}} \quad (3)$$

If the prism is surrounded by a medium with identical index ($N = 1.0$), $\Delta \epsilon / \Delta \alpha = 0$ for all apex angles. That is, to a first order approximation changes in apex angle have no effect. With no electric field applied, light would pass through the prism parallel to the base completely undeviated. With an electric field applied, a deviation would occur—its direction being dependent on electrical polarity.

As above noted, more important than a mere ability to deflect a light beam is the ability to scan through an angle large compared to the angular spread of the beam due to Fraunhofer diffraction. The NRE depends upon the prism aperture. This may be shown by referring to FIGURE 4 where the aperture (A) of the prism is given by:

$$A = \frac{1/2 b \sqrt{1 - N^2 \sin^2 \alpha/2}}{\sin \alpha/2} \quad (4)$$

where $b$ = the prism base width.

The far field half-angle diffraction spread $\theta$ is related to the aperture:

$$\theta \approx \frac{\lambda_0}{A} \quad (5)$$

where $\lambda_0$ is the wavelength of light in deflector 25 without an electric field.

Using Equations 2 and 3, the NRE becomes:

$$\text{NRE} = \frac{b \Delta N}{\lambda_0} \quad (6)$$

Equation 6 is valid for a prism of any material whose index of refraction is variable. For crystalline symmetries other than that of KDP, the crystallographic orientation might be different and the electric field might be applied in a different way, but the basic applicability of this configuration depends only upon the light wavelength, the total change in index obtainable, and the base dimension of the prism.

Materials that are suitable for this purpose include the cubic perovskite family and the short hydrogen-bond class of which, as above noted, KDP is a member.

Examples of the first class are barium titanate, strontium titanate and potassium tantalate niobate (KTN), and of the second class are potassium dihydrogen phosphate (KDP), potassium dideuterium phosphate (KD*P) and potassium dihydrogen arsenate. Two of these, KTN and KD*P, may serve to illustrate the problems inherent in the use of the rest.

The maximum change of index of refraction in KTN has been observed to be $\Delta N = .0067$. Using a light wavelength of 6000 A. for KTN $$\text{NRE} = 112b \quad (7)$$

Large samples of KTN with good electro-optical properties have been limited to dimensions of about one centimeter. Upon choosing $b = 1$ cm., NRE$\approx$100. KTN can perform this well at room temperature since its Curie point is near room temperature.

A change in index of $\Delta N = .008$ has been observed in KD*P at a temperature of approximately $-60°$ C. Again, using a light wavelength of 6000 A., for KD*P, NRE$= 113b$. This material can be obtained in large single crystals whose dimensions span many inches and whose optical quality is excellent. It would be quite practical to choose $b = 10$ cm., and hence NRE$\approx$1300 when maintained in a properly cool and thermally homogeneous environment for such a large crystal.

The other substances listed have varying optical properties and Curie points, with varying degrees of availability and optical qualities. They all, however, are capable of exhibiting large changes in their index of refraction.

In the prior art system represented in FIGURE 3, the gradient is produced transverse to the light path. The light ray instead of being straight becomes part of the arc of a circle while in a region of a linear index of refraction gradient, thereby being deflected.

In FIGURE 3 the deflector 25 of ferroelectric material has length (L) and width (A). Consider that electric field gradient is applied such as to produce an index of refraction gradient, whereby a maximum change in index $\Delta N$ is produced across the bar. Light normally incident upon one end 25a of the bar travels a slightly curved path through the length (L) of the bar and emerges at a deviation angle $\theta$. These quantities are related in the following way:

$$L = \frac{A \tan \theta}{\Delta N / N_0} \quad (8)$$

where $N_0$ = unperturbed index of refraction of the medium.

To a good approximation, Equation 8 reduces to:

$$\theta \approx \frac{L}{A} \cdot \frac{\Delta N}{N_0} \quad (9)$$

In order to determine the NRE, divide $\theta$ by the half-angle Fraunhofer diffraction spread:

$$\lambda_0 / A \quad (10)$$

This results in:

$$NRE \approx \frac{L}{\lambda_0} \cdot \frac{\Delta N}{N_0} \quad (11)$$

This expression is very similar in form to the one obtained for the prism of FIGURE 4. Here, for KTN and $\lambda_0 = 6000$ A., the NRE becomes:

$$NRE \approx 75L \quad (12)$$

and the capability is limited now by the obtainable length of the material in one dimension only.

In the case of KD*P, the NRE becomes:

$$NRE \approx 90L \quad (13)$$

No dimension of the deflector is important other than its length. The availability and quality of the material indicate the NRE, the general magnitudes of which run from 100 to somewhat over 1000.

It is difficult, whatever the temperature, to maintain samples of material in highly stable thermal environments. The large changes in index of refraction are obtained, in ferroelectrics, only at temperatures very near to the Curie point. In this region, the very steep rise in the curve, representing index change as a function of temperature, on the one hand makes possible these large index variations, and on the other hand, places great demands on the temperature stability.

In contrast with the configuration in FIGURE 3, the configuration of FIGURE 2 provides for efficient use of the available index change. A plurality of beam deflectors are effectively formed into one coherent package whose aperture is much greater than that of one unit. Here the deflection angle is the same as for one unit but the Fraunhofer diffraction spread is no much less. The result is to have a much greater NRE.

For FIGURE 2, the analytical expression relating the deviation angle and the total change in index is the same as that previously described in connection with FIGURE 3.

The half-angle diffraction spread due to the aperture A is $\lambda_0/A$ and hence the $$NRE = \frac{L\Delta N}{\lambda_0} \quad (14)$$

In FIGURE 2, however, the aperture is divided among many small sections each deflecting the light by the amount:

$$\theta \approx \frac{\frac{\lambda_0}{2\pi} \cdot \Delta \phi}{A/n} \quad (15)$$

where $n$ is the number of elements.

Except for the discontinuities, the aperture of the system is still A. Therefore, the number of resolvable elements becomes:

$$NRE \approx \frac{L\Delta N}{\lambda_0} n \quad (16)$$

Optical care in the preparation of the crystal will allow operation in accordance with theoretical diffraction limits above discussed. Deuterated KDP has approximately 2½ times the electro-optic response of ordinary KDP, with even larger results as the substance is cooled slightly.

Deuterated KDP has a static dielectric constant greater than 50 at room temperature. This high value inhibits fringe fields to an even greater extent than in KDP, which already has a high dielectric constant. It has been observed that negligible fringe fields occur at distances beyond $\frac{1}{10}$ millimeter from the edge of an electrode pair, in deuterated KDP, when the electrode separation is a few millimeters.

Based upon a sample with dimensions $l = 5$ cm. and $A = 5$ cm. and with thickness across which the field spans of $t = \frac{1}{10}$ cm., it is feasible to use 50 triangular electrode pairs deposited on the large faces of the sample, and spaced one millimeter apart. The number of resolvable elements is then (for $\lambda_0 = 6000$ A.):

$$NRE \approx 4.2 \times 10^6 \Delta N \quad (17)$$

Using a value for $\Delta N$ of $\frac{1}{10}$ percent, instead of nearly one percent, $$NRE \approx 4000 \quad (18)$$

and is proportional to the number of elements.

Having described the present invention in connection with certain specific embodiments thereof, it is to be understood that further modifications may now suggest themselves to those skilled in the art and it is intended to cover such modifications as fall within the scope of the appended claims.

What is claimed is:

1. In a system having a source beam of spatially coherent light, a deflector for said beam which comprises:
    (a) a body having a given aperture in the path of said beam and having a controllable index of refraction, and
    (b) means for varying the index of refraction in said body across the beam simultaneously in a plurality of nonoverlapping, juxtaposed zones having triangular cross sections wherein each zone has one side perpendicular to and facing said source and has another side parallel to the direction of propagation of said beams.

2. The combination set forth in claim 1 wherein said body is formed of material from the class consisting of potassium tantalate niobate, potassium dihydrogen phosphate, potassium dideuterium phosphate and potassium dihydrogen arsenate.

3. The combination set forth in claim 1 wherein said body is formed of potassium tantalate niobate.

4. The combination set forth in claim 1 wherein said body is formed of potassium dideuterium phosphate.

5. In a light scanning system, the combination which comprises:
    (a) a spatially coherent light source,
    (b) a crystal in the path of light from said source having one face perpendicular to said source and of uniform length over the light aperture in the direction of light propagation,
    (c) a plurality of triangular electrodes tiered upon each of the opposite faces of said crystal that are parallel to the direction of propagation wherein each pair of said electrodes has one side parallel to said direction of propagation and a base perpendicular to said direction of propagation, said bases being generally aligned with one another in a common plane, and
    (d) means for simultaneously applying a potential to said electrodes to vary the index of refraction of said crystal in a plurality of identical juxtaposed tiered zones of triangular cross section located between pairs of said electrodes.

6. A system for maximizing the number of resolvable elements in a scanning system which comprises:
    (a) a spatially coherent light source generating a beam,
    (b) a material having a given aperture in the path of light from said source having a controllable index of refraction, and
    (c) means for varying the index of refraction of said material across the beam in a plurality of nonoverlapping, juxtaposed zones of triangular cross section each having one side facing said source and another side parallel to the direction of light traveling from said source.

7. The system according to claim 6 wherein a beam expander is located between said source and said material to expand the beam of light from said source to conform with said aperture and wherein means are provided for bringing the beam emerging from said material to focus at a plane to be scanned by said beam.

8. A method of maximizing the number of resolvable elements in a scanning system which comprises:
   (a) generating a spatially coherent light beam,
   (b) directing said beam through an aperture in a body having a controllable index of refraction, and
   (c) varying the index of refraction of said body across the beam in a plurality of identical nonoverlapping, juxtaposed zones of triangular cross section each having one side perpendicular to and facing said beam and another side parallel to said beam.

9. The method set forth in claim 8 wherein said beam is expanded to conform with said aperture before passing into said body and wherein the beam emerging from said body is focused onto an element to be scanned.

References Cited
UNITED STATES PATENTS

| | | | |
|---|---|---|---|
| 3,290,619 | 12/1966 | Geusic et al. | 332—7.51 |
| 3,400,992 | 9/1968 | McNaney | 350—160 |
| 3,367,733 | 2/1968 | Grau | 350—160 |
| 3,395,960 | 8/1968 | Chang et al. | 350—140 |

RONALD L. W. BERT, Primary Examiner

P. K. GODWIN, Jr., Assistant Examiner